United States Patent [19]

Flotow et al.

[11] Patent Number: 4,549,643
[45] Date of Patent: Oct. 29, 1985

[54] SELF ADJUSTING DEVICE FOR A FRICTION CLUTCH

[75] Inventors: Richard A. Flotow, Butler; William M. Tennant, Auburn, both of Ind.

[73] Assignee: Dana Corporation, Toledo, Ohio

[21] Appl. No.: 535,598

[22] Filed: Sep. 26, 1983

[51] Int. Cl.$^4$ .............................................. F16D 13/75
[52] U.S. Cl. ............................ 192/111 A; 192/12 BA
[58] Field of Search ............ 192/70.25, 111 R, 111 A, 192/111 B, 111 T, 12 BA

[56] References Cited

U.S. PATENT DOCUMENTS

| | | | |
|---|---|---|---|
| 1,525,704 | 2/1925 | Trumble | 192/111 A |
| 1,865,772 | 7/1932 | Lyman | 192/111 A |
| 2,057,803 | 10/1936 | Tatter | 192/12 BA |
| 2,207,051 | 7/1940 | Colman | 192/111 A |
| 2,241,223 | 5/1941 | Spase et al. | 192/111 A |
| 2,280,355 | 4/1942 | Spase et al. | 192/111 A |
| 2,758,691 | 8/1956 | Palm | 192/111 A |
| 3,263,459 | 8/1966 | Bochan | 192/12 BA |
| 3,561,577 | 2/1971 | Binder | 192/111 A |
| 3,752,286 | 8/1973 | Sink | 192/111 A |
| 4,099,604 | 7/1978 | Higgerson | 192/111 A |
| 4,189,043 | 2/1980 | Steinhagen | 192/111 A |
| 4,225,028 | 9/1980 | Wishart | 192/111 A |
| 4,228,883 | 10/1980 | Palmer | 192/111 A |

Primary Examiner—Ronald B. Cox
Attorney, Agent, or Firm—Willian Brinks Olds Hofer Gilson & Lione

[57] ABSTRACT

A self adjusting device interposed in the lever system of a friction clutch is disclosed. The device operatively connects a threaded adjusting ring and an axially shiftable actuating collar such that wear occurring in the friction surfaces of the clutch is automatically taken up during operation of the clutch. The self adjusting device includes a mounting bracket secured to the clutch cover. The mounting bracket includes a central U-shaped portion and a pair of flange portions, each extending outwardly from an end of the opposing sides of the U-shaped portion. A pin is retained in the opposing sides of the U-shaped portion of the mounting bracket. The pin rotatably carries a pair of hub members which effect the self adjustment of the clutch to compensate for wear of the friction surfaces. The U-shaped portion of the mounting bracket permits visual confirmation of correct installation and function of the self adjusting device.

11 Claims, 3 Drawing Figures

SELF ADJUSTING DEVICE FOR A FRICTION CLUTCH

BACKGROUND OF THE INVENTION

1. Field of the Invention

The present invention relates in general to spring-loaded friction clutches and in particular to an improved self adjusting device for automatically compensating for wear in the friction surfaces of such clutches.

Automatic adjusting devices are well known in the art and are typically interposed in the lever system of a friction clutch so as to be operable to compensate for wear of the friction surfaces therein. While a number of such devices operate in a satisfactory manner to compensate for wear, numerous parts are often required to accomplish the desired result. Furthermore, the operating parts are frequently disposed outside the cover of the clutch, thereby subjecting them to possible damage. Those devices which position the operating parts within the cover usually require an excessive number of additional operating parts, resulting in a structure which is exceptionally difficult to service. Also, such devices are typically secured to the cover of the clutch by a mounting bracket which obstructs the view of the inner workings of the adjusting device, making visual confirmation of correct installation and function of the device impossible.

2. Description of the Prior Art

U.S. Pat. No. 3,752,286 to Sink discloses an automatic adjusting device for a spring-loaded friction clutch. The self adjusting device is incorporated in the lever system of the clutch between an actuating collar and an axially movable adjuster ring so as to be operable to advance the adjusting ring by very small increments as the friction surfaces of the clutch wear. The self adjusting device includes a flat mounting bracket which is bolted to the cover of the clutch. A pair of spaced apart ears extend inwardly from the flat mounting bracket so as to support the workings of the self adjuster device.

U.S. Pat. No. 2,241,223 to Spase et al. discloses an automatic wear take-up device for a friction clutch. The device includes a ratchet for coacting with an axially adjustable abutment of the clutch so as to shift the abutment axially. A pawl mechanism is operable by movement of a throw-out sleeve into or out of a position beyond its normal starting position. A closure plate mounted over an opening in the clutch cover can be removed to permit initial positioning of the device.

U.S. Pat. No. 4,099,604 to Higgerson discloses a friction clutch having an integral adjuster mechanism. The adjuster mechanism includes a bracket which is secured to one component of a pressure plate and a pair of lugs which support a cross shaft. A worm gear is supported for rotation with the shaft and is arranged to mesh with dog teeth of a second component of the pressure plate. A primary adjuster lever has two lugs which are pivotally secured about the cross shaft. A secondary adjuster lever is pivotally connected between the primary adjuster lever and a clutch release sleeve.

Other related devices are disclosed in U.S. Pat. No. 1,525,704 to Trumble, U.S. Pat. No. 1,865,772 to Lyman, U.S. Pat. No. 2,207,051 to Colman, U.S. Pat. No. 2,280,355 to Spase et al., U.S. Pat. No. 2,758,691 to Palm, U.S. Pat. No. 4,189,043 to Steinhagen, and U.S. Pat. No. 4,228,883 to Palmer.

SUMMARY OF THE INVENTION

The present invention relates to a self adjusting device interposed in the lever system of a friction clutch. The device operatively connects a threaded adjusting ring and an axially shiftable actuating collar such that wear occurring in the friction surfaces of the clutch is automatically taken up during operation of the clutch. The self adjusting device includes a mounting bracket secured to the clutch cover. The mounting bracket includes a central U-shaped portion and a pair of flange portions, each extending outwardly from an end of the opposing sides of the U-shaped portion. A pin is retained in the opposing sides of the U-shaped portion of the mounting bracket. The pin rotatably carries a pair of hub members which are drivingly connected through a lost motion coupling connection.

A first coil spring is concentrically disposed about the first hub member and has a lever extension formed on one end thereof which is engageable with the actuating collar. A second coil spring is concentrically disposed about the second hub member with one end secured to the mounting bracket. Integral with the second hub member is a worm gear for selectively engaging suitable teeth provided on the adjusting ring. As the friction surfaces of the clutch wear, a release stroke greater than a predetermined amount will cause the first coil spring to drive the first hub member, causing rotation of the worm gear and the adjusting ring. The U-shaped portion of the mounting bracket permits visual confirmation of correct installation and function of the self adjusting device.

It is an object of the present invention to provide an improved self adjusting device for a friction clutch which permits visual observation of the workings of the device so as to permit easy installation and service.

It is another object of the present invention to provide a simple combination of parts within the clutch cover for automatically accomplishing the necessary wear adjustment occurring in the friction surfaces of a friction clutch.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
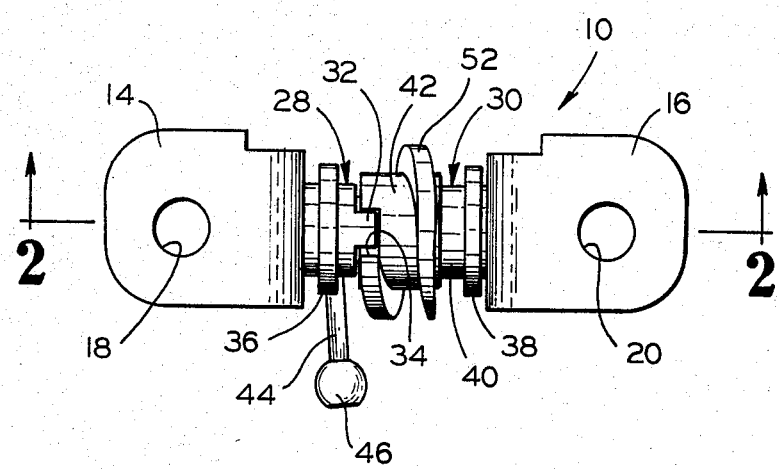
FIG. 1 is a front elevational view of a self adjusting device for a friction clutch in accordance with the present invention.
Figure 2:
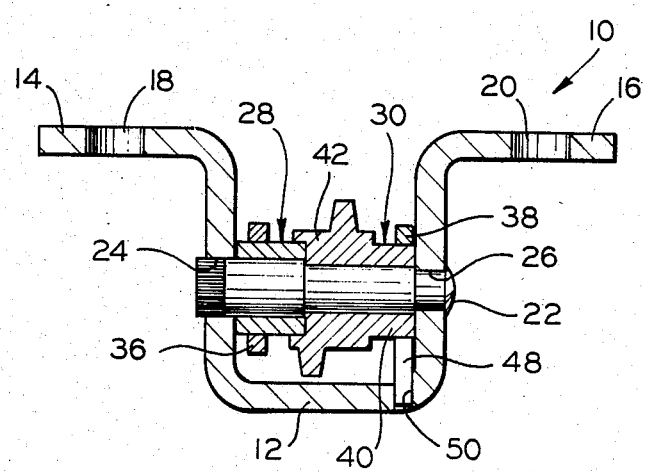
FIG. 2 is a sectional view of the self adjusting device taken along line 2—2 of FIG. 1.
Figure 3:
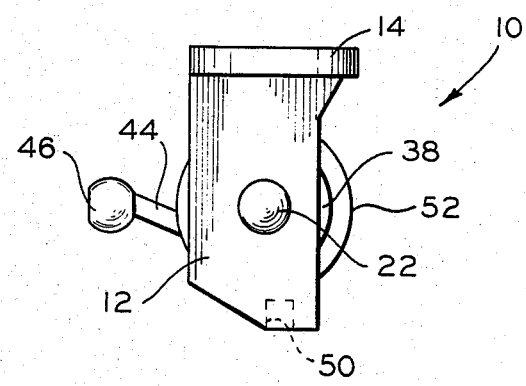
FIG. 3 is a side elevational view from the right, rotated ninety degrees clockwise, of the self adjusting device of FIG. 1.

Referring now to the drawings, there is illustrated in FIGS. 1, 2, and 3 a self adjusting device 10 in accordance with the present invention. The self adjusting device 10 can be utilized in a friction clutch of the type disclosed in U.S. Pat. No. 3,752,286, which disclosure is hereby incorporated by reference. The self adjusting device 10 is adapted to be incorporated in the lever system of the friction clutch (not shown) between the adjusting ring and the actuating collar.

The self adjusting device 10 includes a mounting bracket having a central U-shaped portion 12 and a pair of flange portions 14 and 16 formed at the ends of respective legs of the central portion which extend outwardly at generally right angles from the legs. The flange portions 14 and 16 of the bracket are adapted to be secured to the cover of the clutch by a pair of bolts (not shown) which extend through respective apertures 18 and 20 formed in the flange portions 14 and 16 and into threaded engagement with the cover. As can be seen from the above-referenced patent, the mounting bracket can be disposed across an opening in the back wall portion of the cover of the clutch such that the U-shaped portion 12 extends into the opening toward the flywheel and into the space provided between the adjusting ring and a radially-extending lug of the actuating collar.

A pin 22 is retained by a press fit in a pair of axially-aligned apertures 24 and 26 formed in the opposing legs of the U-shaped portion 12 of the mounting bracket. The pin 22 can be a headless knurled pin. First and second cylindrical hub members 28 and 30 are rotatably supported on the pin 22 between the opposing legs of the U-shaped portion 12. The pin 22 extends through a central axially-extending aperture (not shown) formed in each hub member. The hub members 28 and 30 are operatively connected together through a lost motion coupling connection consisting of a pair of axially-extending, diametrically disposed drive lugs 32 and slots 34 (only one is illustrated). The drive lugs 32 are formed on the inner face of the first hub member 28 and fit into the respective slots 34 formed on the mating inner face of the second hub member 30. The slots 34 are formed wider than the lugs 32 so as to provide a predetermined amount of free movement between the hub members 28 and 30, thereby providing a lost motion connection.

A first single coil square wire spring 36 is concentrically disposed about the cylindrical outer surface of the first hub member 28. A second single coil square wire spring 38 is concentrically disposed about the cylindrical outer surface of a reduced diameter portion 40 provided on the outer end of the second hub member 30. As best illustrated in FIG. 2, the reduced diameter portion 40 of the second hub member 30 provides an outer cylindrical surface equal in diameter to that of the outer cylindrical surface of the first hub member 28. A larger diameter portion 42 of the second hub member 30 is centrally located between the opposing legs of the U-shaped portion 12 of the mounting bracket.

The coil springs 36 and 38 are constructed so as to be substantially equal in size and have internal diameters slightly smaller than the outside diameters of the cylindrical surfaces of the respective hub members 28 and 30. The coil springs 36 and 38 normally embrace the respective cylindrical surfaces of the hub members 28 and 30 under a light tension and, thus, normally exert a slight frictional drag on the hubs 28 and 30. Each of the springs 36 and 38 is coiled in a single generally planar convolution.

The first spring 36 provides a driving connection between the first hub member 28 and the actuating collar of the clutch. An outwardly-extending lever 44 provided at one end while the opposite end of the spring 36 is free. A ball 46 is attached to the lower end of the lever 44 for cooperating with a suitable opening provided in the outer surface of the actuating collar lug.

In order to prevent undesirable rotation of the first hub member 28 when the lever 44 is in a position to unwind the coil spring 36, a braking connection is provided between the second hub member 30 and the stationary U-shaped portion 12 of the mounting bracket by the second spring 38. To this end, the inner end of the second spring 38 is freely disposed about the reduced diameter portion 40, while the opposite end has an outwardly-extending lever 48 which is securely maintained in an aperture 50 formed in the U-shaped portion 12 of the mounting bracket.

To translate movement from the adjusting advice 10 to the adjusting ring of the clutch to accommodate for wear occurring in the friction clutch surfaces, a worm gear 52 is integrally formed on the larger diameter portion 42 of the second hub member 30. The worm gear 52 selectively engages an internally toothed portion formed on the interior peripheral portion of the adjusting ring. The manner in which the self adjusting unit 10 cooperates with the actuating collar so as to compensate for wear occurring in the friction clutch surfaces is set forth in detail in the above-referenced patent.

It can be seen that the present invention provides an improved mounting bracket for supporting the components of the self adjusting device 10 wherein the bracket is formed with an intermediate U-shaped portion 12 which projects into the clutch housing. The U-shaped portion 12 of the bracket extends inwardly within the clutch and supports the components of the self adjusting device 10 so that the various connecting portions of the device 10 and the clutch can be seen from outside of the clutch when assembling the device 10. Thus, the present invention provides an important advantage over the prior art by permitting an unobstructed view of the inner workings of the self adjusting unit 10 and its relationship to the clutch.

In accordance with the provisions of the patent statutes, the principle and mode of operation of the present invention have been explained and illustrated in its preferred embodiment. However, it must be understood that the present invention can be practiced otherwise than as specifically explained and illustrated without departing from its spirit or scope.

What is claimed is:

1. A self adjusting device adapted to engage an actuating means and a movable adjusting means in a friction clutch so as to compensate for wear on friction surfaces of the clutch, the device comprising:
   a mounting bracket adapted to be secured to the clutch, said mounting bracket including a central U-shaped portion and a flange portion formed at the end of each of the legs of said central U-shaped portion;
   first and second rotatable hub members rotatably supported by said legs of said central U-shaped portion and a lost motion coupling connection therebetween;
   a coil spring for rotating said first hub member upon being actuated, said coil spring connected to and acutated by the actuating means; and
   means formed on said second hub member and connected to the adjusting means for moving the adjusting means so as to compensate for wear on the friction surfaces of the clutch, said coil spring being actuated upon movement of said actuating means to rotate said first hub member and, through said lost motion coupling connection, to actuate said second hub member for causing said means formed on said second hub member to move said adjusting means.

2. The invention defined in claim 1 further including a second coil spring for braking said second hub member, said first coil spring connected to and actuated by said actuating means upon movement thereof in one direction and said second coil spring having one end secured to said support means and an opposite end free for providing a braking connection for said second hub member prohibiting movement thereof upon movement of said actuating means in an opposite.

3. The invention defined in claim 2 wherein said first and second coil springs each include a single coil spring having a generally planar convolution.

4. The invention defined in claim 3 wherein said first and second coil springs each have an internal diameter slightly less than an external diameter of said respective hub members engaged thereby.

5. The invention defined in claim 3 wherein said lost motion coupling connection includes at least two drive lugs and slots formed on said first and second hub members respectively, for mutual engagement and dimensioned to permit limited free movement of said hub members before engaging and effecting movement of said pivotal connection.

6. A clutch comprising:
a drive member;
support means secured to said drive member;
a clutchable driven member;
means for clutching said driven member to said drive member including lever means having a pivotal connection;
movable actuating means operably connected to said lever means to pivot said lever means about said pivotal connection to clutch said drive and driven members;
adjusting means supporting said pivotal connection and connected to said support means for relative rotational movement; and
an adjuster device mounting on said support means including a mounting bracket including a central U-shaped portion and a flange portion formed at the end of each of the legs of said central U-shaped portion, first and second rotatable hub members rotatably supported by said legs of said central U-shaped bracket and having a lost motion coupling connection therebetween, a coil spring for rotating said first hub member upon being actuated, said coil spring connected to and actuated by said actuating means, and a worm gear integral with said second hub member and connected to said adjusting means for rotating said adjusting means relative to said support means, said coil spring being actuated upon movement of said actuating means to rotate said first hub member and, through said lost motion coupling connection, to actuate said second hub member for causing said worm gear on said second hub to rotate said adjusting means relative to said support means for moving said pivotal connection.

7. The invention defined in claim 6 further including a second coil spring for braking said second hub member, said first coil spring connected to and actuated by said actuating means upon movement thereof in one direction and said second coil spring having one end secured to said support means and an opposite end free for providing a braking connection for said second hub member prohibiting movement thereof upon movement of said actuating means in an opposite.

8. The invention defined in claim 7 wherein said first and second coil springs each include a single coil spring having a generally planar convolution.

9. The invention defined in claim 8 wherein said first and second coil springs each have an internal diameter slightly less than an external diameter of said respective hub members engaged thereby.

10. The invention defined in claim 8 wherein said lost motion coupling connection includes at least two drive lugs and slots formed on said first and second hub members respectively, for mutual engagement and dimensioned to permit limited free movement of said hub members before engaging and effecting movement of said pivotal connection.

11. In a friction clutch including a drive member, support means secured to said drive member, a clutchable driven member, means for clutching the driven member to the drive member including lever means having a pivotal connection, movable actuating means operably connected to the lever means to pivot the lever means about the pivotal connection to clutch said drive and driven members, adjusting means supporting the pivotal connection and connected to the support means for relative rotational movement and an adjuster device mounted on the support means to rotate the adjusting means relative to the support means for moving the pivotal connection, the improvement comprising a mounting bracket adapted to be secured to the clutch, said mounting bracket including a central U-shaped portion and a flange portion formed at the end of each of the legs of said central U-shaped portion such that said central U-shaped portion thereof extends inwardly within the clutch and supports the adjuster device, whereby the components of the adjuster device can be seen from the outside of the clutch.

* * * * *